United States Patent
Huang et al.

(10) Patent No.: US 8,391,547 B2
(45) Date of Patent: Mar. 5, 2013

(54) METHOD AND APPARATUS FOR DETECTING OBJECTS OF INTEREST IN SOCCER VIDEO BY COLOR

(75) Inventors: Yu Huang, Plainsboro, NJ (US); Joan Llach, Princeton, NJ (US); Sitaram Bhagavathy, Plainsboro, NJ (US)

(73) Assignee: Thomson Licensing, Boulogne Billancourt (FR)

( * ) Notice: Subject to any disclaimer, the term of this patent is extended or adjusted under 35 U.S.C. 154(b) by 832 days.

(21) Appl. No.: 12/450,410

(22) PCT Filed: Nov. 6, 2007

(86) PCT No.: PCT/US2007/023317
§ 371 (c)(1),
(2), (4) Date: Sep. 24, 2009

(87) PCT Pub. No.: WO2008/118147
PCT Pub. Date: Oct. 2, 2008

(65) Prior Publication Data
US 2010/0098307 A1    Apr. 22, 2010

Related U.S. Application Data

(60) Provisional application No. 60/919,971, filed on Mar. 26, 2007.

(51) Int. Cl.
G06K 9/00 (2006.01)
G06K 9/34 (2006.01)
(52) U.S. Cl. .................... 382/103; 382/128; 382/173
(58) Field of Classification Search .................. None
See application file for complete search history.

(56) References Cited

U.S. PATENT DOCUMENTS

| | | | | | |
|---|---|---|---|---|---|
| 5,495,297 | A | * | 2/1996 | Fujimori et al. | 348/590 |
| 5,684,940 | A | * | 11/1997 | Freeman et al. | 345/630 |
| 6,128,046 | A | * | 10/2000 | Totsuka et al. | 348/590 |
| 6,411,744 | B1 | * | 6/2002 | Edwards | 382/294 |
| 7,162,082 | B2 | * | 1/2007 | Edwards | 382/173 |
| 7,194,117 | B2 | * | 3/2007 | Kaufman et al. | 382/128 |
| 7,474,775 | B2 | * | 1/2009 | Abramoff et al. | 382/128 |
| 7,477,768 | B2 | * | 1/2009 | Kaufman et al. | 382/128 |
| 7,502,498 | B2 | * | 3/2009 | Wen et al. | 382/128 |
| 7,692,664 | B2 | * | 4/2010 | Weiss et al. | 345/592 |

OTHER PUBLICATIONS

Mukundan et al.:"Image Analysis by Tchebichef Moments," IEEE Transactions on Image Processing, 2001, vol. 10, No. 9, Sep. 200, pp. 225-233.
Petkovic et al.:"Recognizing Strokes in Tennis Videos Using Hidden Markov Models," 2001, XP002493177.
Bai et al.:"Skeleton Pruning by Contour Partitioning," LNCS 4245, Jan. 1, 2006, pp. 567-579.
Correia et al.:"Objective Evaluation of Video Segmentation Quality," IEEE Transactions on image Processing, vol. 12, No. 2, Feb. 2003.
Roy et al.:"Text/Graphics Separation in Color Maps," IEEE Proceedings of the International Conference on Computing, Mar. 1, 2007, Computer Society.

(Continued)

*Primary Examiner* — Manav Seth
(74) *Attorney, Agent, or Firm* — Robert D. Shedd; Reitseng Lin

(57) ABSTRACT

A method is disclosed for detecting and locating players in soccer video frames without errors caused by artifacts by a shape analysis-based approach to identify the players and the ball from roughly extracted foregrounds obtained by color segmentation and connected component analysis, by performing a Euclidean distance transform to extract skeletons for every foreground blob, by performing a shape analysis to remove false alarms (non-players and non-ball), and then by performing skeleton pruning and a reverse Euclidean distance transform to cut-off the artifacts primarily caused by playing field lines.

20 Claims, 2 Drawing Sheets

OTHER PUBLICATIONS

Bloom et al.:"Player Tracking and Stroke Recognition in Tennis Video," 2003, pp. 93-97.
Figueroa et al.:"Background Recovering in Outdoor Image Sequences: An Example of Soccer Players Segmentation," Image and Vision Computing 24, Apr. 1, 2006, pp. 363-374.
Coeurjolly et al.:"Optimal Separable Algorithms to Compute the Reverse Euclidean Distance Transformation and Discrete Medial Axis in Arbitrary Dimension," IEEE Transactions on Pattern Analysis and Machine Intelligence, vol. 29, No. 3, Mar. 1, 2007, pp. 437-448.
Liang et al.:"A Scheme for Ball Detection and Tracking in Broadcast Soccer Video," PCM, 2005, Part 1, LNCS 3767, pp. 864-875.
Needham et al.:"Tracking Multiple Sports Players through occlusion, congestion and scale," School of Computing, The university of Leeds, 2001, Leeds, UK, pp. 93-102.
D'Orazio et al.:"A Ball Detection Algorithm for Real Soccer Image Sequences," IEEE, 2002, pp. 210-213.
Wang et al.:"Survey of Sports Video Analysis: Research Issues and Applications," 2003, School of Computer Science and Engineering.
Ozcanli et al.:"Augmenting Shape with Appearance in Vehicle Category Recognition," Division of Engineering Brown university, Providence, RI, IEEE, 2006.
Utsumi et al.:"An Object Detection Method for Describing Soccer Games from Video", 2002.
Coeurjolly et al.:"Optimal Seperable Algorithms to Compute the Reverse Euclidean Distance Transformation and Discrete Medial Axis in Arbitrary Dimension," IEEE Transactions on Pattern Analysis and Machine Intelligence, vol. 29, No. 3, Mar. 2007, pp. 437-448.
Yu et al.:"Current and Emerging Topics in Sports Video Processing," IEEE, 2005.
Gong et al.:"Automatic Parsing of TV Soccer Programs," IEEE, 1995, pp. 167-174.
Yu et al.:"A Ball Tracking Framework for Broadcast Soccer Video," ICME 2003, IEEE, pp. II-273-II-276.
He et al.:"Object Recognition and Recovery by Skeleton Graph Matching," ICME 2006, IEEE, pp. 993-996.
Tong et al.:"An Effective and Fast Soccer Ball Detection and Tracking Method," IEEE.Computer Society, 2004, Proceedings of the 17th International Conference on Pattern Recognition, ICPR'04.
Jones et al.:"Statistical Color Models with Application to Skin Detection," Cambridge Research Laboratory Compaq Computer Corporation, Jun. 1999, pp. 1-23.
Huang et al.:"Players and Ball Detection in Soccer Videos Based on Color Segmentation and Shape Analysis," Jun. 30, 2007, Thomson Corporation Research, Princeton, NJ.
Nemethova et al.:"Preprocessing of Ball Game Video Sequences for Robust Transmission Over Mobile Network," Published in the Proceedings of CIC, Seoul, Korea, Oct. 25-28, 2004.
Renno et al.:"Shadow Classification and Evaluation for Soccer Player Detection," Sep. 2004, Digital Imaging Research Centre, Kingston University.
Liu et al.:"Playfield Detection Using Adaptive GMM and Its Application.", Mar. 2005.
Tam et al.:"Feature-Preserving Medial Axis Noise Removal," Department of Computer Science, 2002.
Choi et al.:"Where are the Ball and Players? : Soccer Game Analysis with Color-based Tracking and Image Mosaick," Sep. 1997, Dept. of EE, Phang University of Science and Technology, Pohang, Korea, pp. 1-15.
Zhao et al.:"Segmentation and Tracking of Multiple Humans in Complex Situations," 2001, University of Southern California, Institute for Robotics and intelligent Systems.
Singh.:"Robust Tracking and Human Activity Recognition," 2004, XP002493180, University of Alberta, Edmonton, Alberta, CA.
Richner et al.:"Root Image Analysis and Interpretation, in Root Methods: A Handbook, Edited by A.L. Smit, A, G, Bengough, C. Engels, M. Van Noordwijk, S. Pellerin, and S.C. Van De Geijn," 2000, XP002493181, Springer Press, Berling Heidelberg, pp. 317,318,322,327.
European Search Report dated Feb. 17, 2009.
Liao, et al., "Swimming Style Classification from Video Sequences", 16 THIPPR Conference on Computer Vision, Graphics and Image Processing, Aug. 17, 2003, pp. 226-233.

* cited by examiner

METHOD AND APPARATUS FOR DETECTING OBJECTS OF INTEREST IN SOCCER VIDEO BY COLOR

CROSS-REFERENCE TO RELATED APPLICATION

This application claims the benefit, under 35 U.S.C. §365 of International Application PCT/US2007/23317, filed on Nov. 6, 2007, which was published in accordance with PCT Article 21(2) on Oct. 2, 2008, in English and which claims the benefit of U.S. provisional patent application No. 60/919,971, filed on Mar. 24, 2007, in English.

BACKGROUND OF THE INVENTION

1. Field of the Invention

The present invention generally relates to a method and apparatus for detecting objects in a video frame and, more particularly, to a method and apparatus for detecting players and a ball in soccer videos by using color segmentation and shape analysis techniques.

2. Background Information

In soccer videos, the soccer players and the ball are the most important objects in that they represent a large amount of information about each instant of a game. Detection and tracking of the players and the ball have been motivated by various applications, such as event detection, tactics analysis, automatic indexing/summarization, and object-based compression.

Known methods for locating the ball as well as the players in soccer videos can be divided in two distinct groups: the first group of methods makes use of fixed cameras, usually calibrated in advance, in a controlled environment, whereas the second group of methods employs regular broadcast videos. While the former can provide better performance, the latter appear to be more flexible.

Since soccer is a spectator sport, the playing field, the lines, the ball, and the uniforms of the players are designed to be visually distinctive in color. In spite of this visual distinctiveness, detection of the players and the ball is not without error. Some approaches in the second group of methods have attempted to mitigate detection difficulties by finding the grass playing field first through the use of color segmentation and post-processing with morphological operations, such as connected component analysis, in order to limit the search area. But errors still occur. Errors can be categorized at least as false alarms and as artifacts. A false alarm refers to the identification and detection of a non-player as a player or the identification and detection of a non-ball as the ball. An artifact arises when the lines on the playing field, for example, merge with portions of a detected player.

Accordingly, there is a need for a method for substantially eliminating errors that occur in the detection of soccer players and the soccer ball in soccer videos.

SUMMARY OF THE INVENTION

Substantial elimination of errors in the detection and location of soccer players and the soccer ball in soccer videos is achieved, in accordance with at least one aspect of the invention, by a shape analysis-based approach to identify the players and the ball from roughly extracted foregrounds obtained by color segmentation and connected component analysis, by performing a Euclidean distance transform to extract skeletons for every foreground blob, by performing a shape analysis to remove false alarms (non-players and non-ball), and then by performing skeleton pruning and a reverse Euclidean distance transform to cut-off the artifacts primarily caused by playing field lines.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

The exemplary embodiments set out herein illustrate preferred embodiments of the invention, and such exemplary embodiments are not to be construed as limiting the scope of the invention in any manner.

DETAILED DESCRIPTION

It is to be understood that terms such as "playfield", "playing field", and "soccer field" are intended to be synonymous in referring to the pitch upon which the soccer match is played. It is further understood that references to "players" are intended to include players and/or referees alike. The principles of the invention are not limited to a soccer field but can be applied to other play scenes, such as basketball, baseball, football, tennis, and volleyball fields. They can be applied to scene of mountain claiming as well.

As mentioned above, perhaps the most informative feature in soccer video is color: the playfield is green, the lines are white, the ball is generally white or bright, and the teams as well as the referee are dressed at least in jerseys that allow them to be distinguished easily. In other scenes, the colors of the playfield (background) and the colors of non-playfield (foreground) may be different. For example, the color of a soccer ball is normally white but the color of a basketball is normally orange. For the duration of play, it is understood that all objects of interest (OOI) are supposed to be inside the playing field area. Therefore, extraction of playfield based on color segmentation plays an essential role in automatic soccer video analysis.

There are many ways to represent the playing field color. One relatively simple way to represent the color of the soccer field is by using a constant mean color value obtained through prior statistics over a large data set. The color distance between a chosen pixel in a video frame and the mean value of the field is used to determine whether or not that chosen pixel belongs to the set of pixels for the playing field. Since the soccer field is roughly green colored, the hue component defined in Smith's hexagonal cone model can be used to detect the green colored pixels given a certain range. It is understood that, while the soccer field has a green coloration in general, it may exhibit some differences in hue based upon appearances caused by lighting patterns (e.g., natural versus artificial lighting and shadows) and field characteristics such as worn out areas, grass mowing patterns, grass growing patterns and the like.

A histogram can be employed as a non-parametric color model for playfield. In certain applications it is preferable to find a dominant color assuming that the field has a uniform color of green and occupies the largest area in each frame. Single Gaussian statistics or a mixture of Gaussian (MoG) statistics can be learned to represent a color model of the playfield and can be adapted by an Expectation-Maximization (EM) algorithm incrementally.

Figure 1:
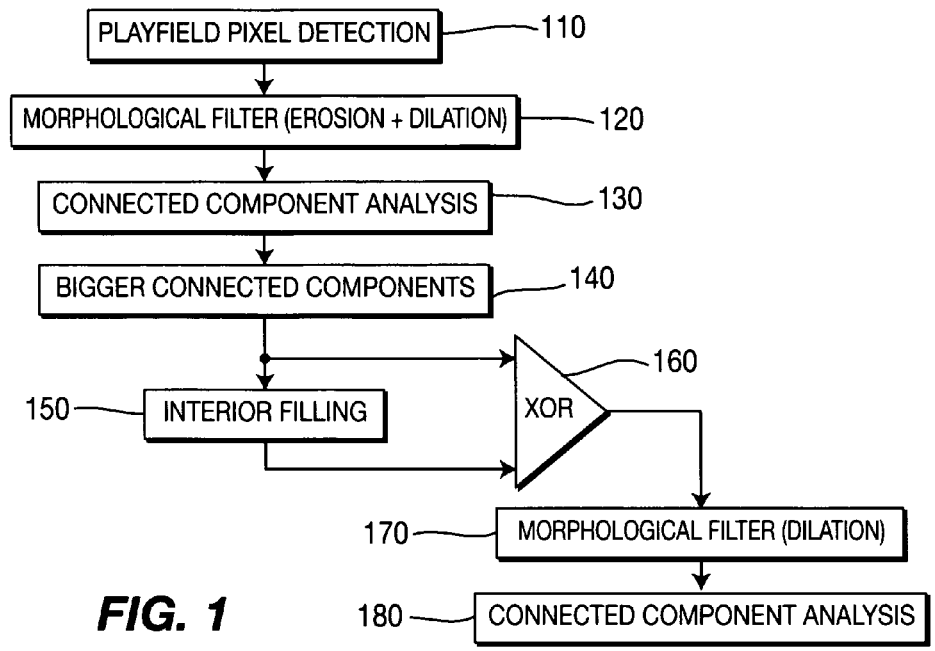
FIG. 1 illustrates an exemplary method for playfield detection and foreground blob extraction in accordance with the principles of the present invention.

Reference is now made to the drawings, and more particularly to FIG. 1, in which an exemplary method is shown for detecting and extracting the playing field from a soccer video image frame. Headings are used to assist the reader in locating and identifying general operations performed throughout the inventive method.

Playfield Pixel Detector

Playing field detection is carried out in step 110 of the method shown in FIG. 1. Detection is accomplished by a simple histogram learning technique applied to a playfield pixel from the image frame. In this technique, a color histogram having N bins per channel in the red-green-blue (RGB) color space is defined as a generic color model. Channel in this context refers to the red, green, and blue components. This generic color model can be developed in many ways known in the art such as by a priori learning based on a training set of soccer game videos. In such a training set of videos, playfield pixels and non playfield pixels may be labeled as such in a manual or semi-supervised manner. Thereafter, based on its RGB color vector, each labeled playfield pixel is placed into the appropriate bin of the playfield histogram. A similar process is carried out for the pixels labeled as non-playfield. The histogram counts are converted into a discrete conditional probability distributions in the usual manner as follows:

$$P(rgb \mid playfield) = \frac{f(rgb)}{T_f},$$

and $$P(rgb \mid \text{non\_playfield}) = \frac{n(rgb)}{T_n},$$

where f(rgb) gives the count in bin rgb of the playfield histogram, n(rgb) is the count in bin rgb from the non-playfield histogram, and $T_f$ and $T_n$ are the total counts defined by summing the individual counts over all the bins in the playfield and non-playfield histograms, respectively.

Using the probability information above, a playfield pixel classifier can be realized by using a standard likelihood ratio approach using conditional probabilities. For example, a particular RGB value is labeled playfield if:

$$\frac{P(rgb \mid playfield)}{P(rgb \mid \text{non\_playfield})} \geq \phi,$$

where $0 \leq \phi \leq 1$ is a threshold that can be adjusted between the limits in order to achieve an appropriate trade-off between correct detections and false positives. A false positive occurs when, for example, a non-playfield pixel is labeled as a playfield pixel. In contrast, a false negative occurs when, for example, a playfield pixel is labeled as a non-playfield pixel.

Threshold $\phi$ can then be expressed as a function of the a priori probabilities and the costs of false positives and false negatives as $$\phi = \frac{c_p P(\text{non\_playfield})}{c_n P(playfield)},$$

where $c_p$ and $c_n$ are application-dependent costs of false positives and false negatives, respectively. The a priori probability for the playing field can be derived as $T_f/(T_f+T_n)$, while the a priori probability for the non-playing field can be derived as $T_n/(T_f+T_n)$.

The number of bins per channel, N, and the detection threshold, $\phi$, can be chosen based upon a receiver operating characteristic (ROC) curve that plots the probability of correct detection against the probability of false detection and the number of bins per channel is varied across a range of values such as for N as 32 to 256 bins. The probability of correct detection is defined as the fraction of pixels labeled as playfield that are thereby correctly classified. The probability of false detection is defined as the fraction of pixels labeled as non-playfield that are thereby incorrectly classified. Detection performance improves as the area under an ROC curve increases. From experimental practice, it has been found that N=128 bins gives suitable results. It is then possible to choose a suitable operating point to achieve a suitable, application dependent trade-off between the probability of correct detection and the probability of false detection (i.e., false positives). The value of detection threshold $\phi$ corresponding to the operating point is then used for the pixel classification in the equation above. In one example from experimental practice, the number of bins N=128 and the threshold $\phi$=0.1 have been selected to achieve a probability of correct detection at 0.935 and a probability of false detection at 0.057.

As a result of the playfield pixel detection in step 110, each frame is processed to yield a binary mask. Pixel values are classified as either a binary "1" or a binary "0".

Playfield Extraction

Morphological filtering, including the operations of erosion and then dilation, is applied to the binary mask of the frame in step 120 to eliminate the noise and makes regions homogeneous. Morphological filtering is a known process for image enhancement that tends to simplify the image and thereby facilitate the search for objects of interest. It generally involves modifying the spatial form or structure of objects within the image. Dilation and erosion are two fundamental morphological filtering operations. Dilation allows objects to expand, thus potentially filling in small holes and connecting disjoint objects. Erosion is the complementary operation to dilation in that erosion shrinks objects by etching away (eroding) their boundaries. These operations can be customized for each application by the proper selection of a structuring element, which determines exactly how the objects will be dilated or eroded.

Connected components analysis (CCA) in step 130 is employed to scan the binary mask and group the mask pixels into connected components based on pixel connectivity. That is, the pixels identified in a connected component share the same binary values and they are in some way connected with each other, such as 4-connectivity or 8-connectivity also called 4- and 8-point neighborhood systems, respectively. Connected components analysis tools and techniques are well known in the art and will not be disclosed further herein.

The playfield is understood to include several connected components in the image, each of them is bigger in size than a given area threshold in step 140. This step allows all the playfield components to be tested against a threshold so that smaller playfield components can be removed. The playfield mask is obtained in step 150 by filling the interior of each bigger connected component defined by the connected component boundary. In step 160, an exclusive-OR function is applied to the output masks in steps 140 and 150 in order to produce a mask of the extracted playfield areas.

Foreground Blob Detection

Foreground blob extraction is then performed in steps 170 and 180. A blob is simply a region of a connected grouping of pixels. Ideally, the non-playfield pixels inside the extracted playfield areas from step 160 are expected to be foreground pixels that can be grouped into different foreground blobs by connected component analysis. Since the ball is a relatively small object of interest and generally less than 30 pixels in size, it is only possible to perform dilation before grouping pixels into different blobs only to make regions homogeneous. Performing erosion at this stage in the morphological filtering step would damage the image by possibly erasing the ball. Noise in certain areas of the image must be removed later by shape analysis and use of an appearance model of the true objects.

Object Appearance

In long view shots of the field, all the lines and arcs on the playing surface such as the touch, center, penalty area, and bye lines appear white or nearly white. Similarly, for such long view shots of the field, the ball appears nearly white regardless of any patterns or logos that are on it. A simple method to identify white pixels in each foreground blob is as follows:

$$W(x, y) = \begin{cases} 1, & \text{if } (r(x,y)-1/3)^2 + \\ & (b(x,y)-1/3)^2 < a, \text{ and if } I(x,y) > b \\ 0, & \text{otherwise,} \end{cases}$$

where $r(x,y)$ and $b(x,y)$ are normalized red and blue component for a particular pixel $(x,y)$, $I(x,y)$ denotes the intensity value of pixel $(x,y)$, and $W(x,y)$ is the white pixel mask for the pixel $(x,y)$. The threshold values a and b are determined empirically.

Basic Shape Analysis

Region properties for each blob can be categorized by a few basic shape descriptors as follows:

1. Perimeter, P, the number of pixels in the boundary;
2. Area, A, the number of pixels;
3. Major/Minor axes, $C_L$ and $C_S$, where $C_L$ is the longest chord and $C_S$ is the chord perpendicular to $C_L$;
4. Roundness, F, defined as $F=P^2/(4\pi A)$; and
5. Eccentricity, E, defined as $E=C_L/C_S$.

The region properties for each blob as described above are used primarily in the inventive method described herein for isolated ball detection as described below.

Skeletons and the Distance Transform

Skeletons provide an intuitive, compact representation of a shape. One of the important features of skeletons is separation of the topological properties for a shape from the geometric properties of that shape. A skeleton, as its name implies, is a set of curves that approximates the local symmetry axis of the shape for the object of interest. An alternative definition for a skeleton is based on a distance transform.

The distance transform or distance map is a function that, for a given point inside a shape, computes the distance from the given point to the point on an outline of that shape closest to the given point. For a foreground binary mask W of size m×n, $\overline{W}$ denotes the complementary mask of W in the sense that $\overline{W}$ includes the set of background pixels. Its squared distance transform (SDT) is given by the shape map $H=\{h(x,y)\}$ as follows:

$$h(x,y) = \min\{(x-i)^2+(y-j)^2;\ 0 \leq i < m,\ 0 \leq j < n, (i,j) \in \overline{W}\}.$$

For a set of foreground pixels V and a picture $F=\{(f(x,y)\}$ of size m×n, it is shown that either $f(x,y)$ is set to the squared distance transform value $h(x, y)$ when the pixel $(x,y)$ belongs to the foreground pixel set V or $f(x,y)$ is set to 0 otherwise. As a result, the reverse Euclidean distance transform (REDT) of V consists of the set of points W such that:

$$W=\{(x,y) | \max\{f(i,j)-(x-i)^2-(y-j)^2\} > 0, \text{ for } 0 \leq i < m, 0 \leq j < n, \text{ and } (i,j) \in F\}.$$

Thus, the shape map $H=\{h(x,y)\}$ can be computed using the picture F as follows:

$$h(x,y) = \max\{f(i,j)-(x-i)^2-(y-j)^2, \text{ for } 0 \leq i < m, 0 \leq j < n, \text{ and } (i,j) \in F\}.$$

It is then possible to obtain W by extracting all pixels of strictly positive values from the shape map H computed above Skeleton Descriptor Given squared distance transform of the shape $H=\{h(x,y)\}$, its skeleton Ske is defined as follows:

$$Ske = \left\{(x,y) | \exists (i,j), \text{ where } (x-i)^2 + (y-j)^2 < h(x,y), \right.$$

$$\left. \text{and } \max_{(u,v)}\{h(u,v)-(x-u)^2-(y-v)^2\} = h(x,y)-(i-x)^2-(j-y)^2\right\}$$

By comparing the above equation with the definition of the REDT discussed above, it can be seen that it is possible to obtain the skeleton Ske by applying the reverse Euclidean distance transform operation to the squared distance transform of the shape in which only the upper envelope elliptic paraboloids are marked.

The reverse Euclidean distance transform is based on a Power diagram construction as follows:

Given a set of sites $S=\{s_i\}$, the Voronoi diagram is a decomposition of the plane into cells $C=\{c_i\}$ (one cell per site) such that, for each point p in the open cell $c_i$, it is closer to the site $s_i$ than to any other site $s_j (i \neq j)$.

The Power diagram is a kind of Voronoi diagram based on the metric induced by a power function defined by $$\sigma_i(p) = d(p, s_i) - f(i)^2,$$

where $f(i)$ is a radius associated to each site $s_i$, and $d(\cdot)$ is the Euclidean distance function. The Power labeling assigns, to each point of the plane, the index of the cell containing it in the Power diagram.

The reverse Euclidean distance transform is linked to computation of nonempty cells in the Power labeling. Consequently, the skeleton corresponds to the nonempty cells in the Power Diagram.

Based on an extracted skeleton, additional descriptors useful for shape analysis can be computed as follows:

1. Length of the skeleton, $L_S$;
2. Covering, $C_{Ske}$, defined as the number of pixels in Power labeling associated with a skeleton point);
3. Maximal thickness of the skeleton, $d_{max}$, which is the maximum thickness of the corresponding blob;
4. Elongation, $A/(2d_{max})^2$; and
5. Aspect ratio, $L_S/d_{max}$.

The extracted skeleton and its descriptors are used primarily in the inventive method described herein for player detection and artifact removal by skeleton pruning as described below.

Isolated Ball Detection

Basic shape analysis proves to be the more important tool for isolated ball detection. The ball appears as a relatively small blob in long distance frames of the video thereby rendering the use of skeleton descriptors unreliable.

There appears to be a predefined range for the area A of a blob representing the ball. That range is dependent upon the camera configuration in relation to the playing field. Furthermore, the proportion of white pixels W(x,y) detected by the color model in the blob corresponding to a ball indicates the possibility for that blob being a ball. Roundness F and eccentricity E for the blob of interest should be close to 1.0 in order for that blob to be considered as a ball. The latter two characteristics are different from E and F for disconnected segments of field lines.

With this in mind, it is possible to detect a particular blob as a ball by computing the function B as follows:

$$B = \begin{cases} 1, & \text{for } p_w > r_w \text{ and } ar_{min} < A < ar_{max} \\ & \text{and } F < f_{max} \text{ and } E < e_{max} \\ 0, & \text{otherwise,} \end{cases}$$

where $p_w = C\{(x, y) | W(x, y)=1\}/A$, $C\{\cdot\}$ is a count of the number of white pixels, and all the thresholds, $r_w$, $ar_{min}$, $ar_{max}$, $f_{max}$, and $e_{max}$, are determined empirically. When function B equals 1, the blob is detected as a ball; otherwise, the blob is detected as not being a ball.

Figure 2:
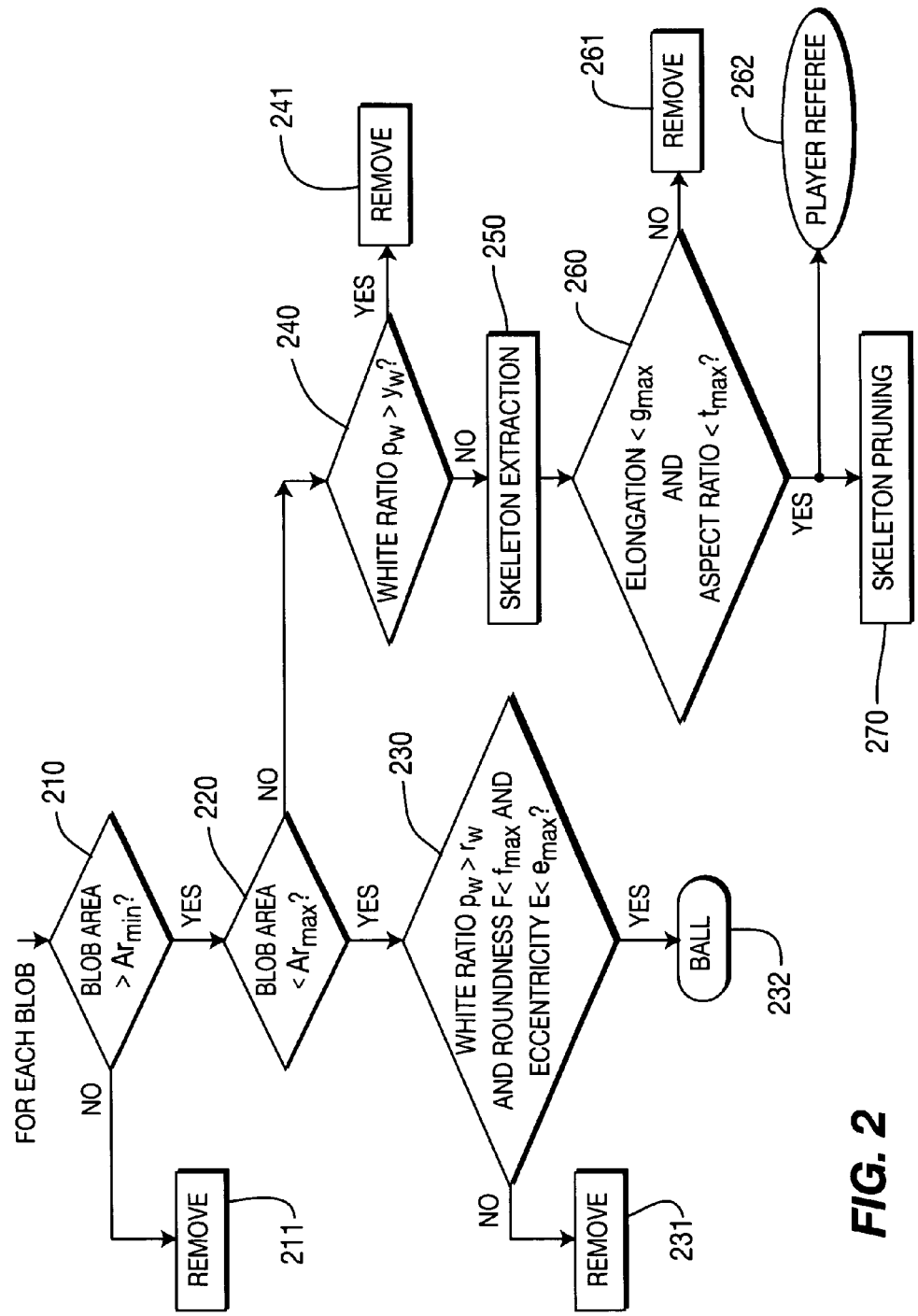
FIG. 2 illustrates an exemplary method for detecting isolated players and an isolated ball together with artifact removal in accordance with the principles of the present invention.

The shape analysis process as applied for isolated ball detection is shown in FIG. 2. The process in FIG. 2 is applied to each blob as follows. In step 210, in order to remove those blobs that are too small to be a ball and a human object, the blob area A may be compared with a minimum threshold $ar_{min}$. If the blob area A exceeds the threshold, then processing of the blob continues to step 220; otherwise the blob is removed (i.e., B=0) as shown in step 211.

In step 220, the blob area A is compared with a maximum threshold $ar_{max}$. If the blob area A is less than the threshold, then processing of the blob continues to step 230; otherwise the blob is sent for further processing to step 240.

In step 230, the white ratio $p_w$, the roundness F, and the eccentricity E of the blob are tested against their respective thresholds, $r_w$, $f_{max}$, and $e_{max}$, as shown in the equation above. In the event that all the characteristics being tested in step 230 meet their respective criteria as shown therein, then it is decided in step 232 that the blob of interest is a ball (i.e., B=1); otherwise the blob is removed (i.e., B=0) as shown in step 231.

Isolated Player and Referee Detection

In general, an isolated player or referee blob exhibits an elliptical shape. As such, the player blob, when represented by its skeleton, is recognizable with a limited elongation and a limited aspect ratio. These constraints can also help in removing some fragments of field lines or curves that have been erroneously merged into the player blob.

Since the field lines look white or nearly white in color and since the similarly colored ball has been detected, it is possible to again use the proportion of white pixels as an index for detecting non-player blobs. As discussed above with respect to the ball, an area range for the player or referee blob is predefined according to the camera configuration. That range is dependent upon the camera configuration in relation to the playing field.

Removal of field lines and detection of players or referees is depicted on the right side of FIG. 2 in steps 240 through 270. In step 240, the white pixel ratio for the blob of interest is compared with a threshold $y_w$. If the threshold is exceeded, the blob of interest is removed as being a non-player in step 241. If, on the other hand, the white ratio is less than or equal to the threshold in step 240, the blob of interest is further processed in step 250.

In step 250, the skeleton extraction is performed on the blob of interest as described above. After the additional descriptors are measured for the skeleton of the blob of interest, the elongation and/or aspect ratio for the blob are tested against their respective thresholds, $g_{max}$ and $t_{max}$, as shown in step 260. If either or both descriptors are less than their respective thresholds, then the player or referee is detected as shown in step 262. If either one or both descriptors is greater than or equal to the respective threshold, then the blob of interest is removed as shown in step 261.

Figure 3:
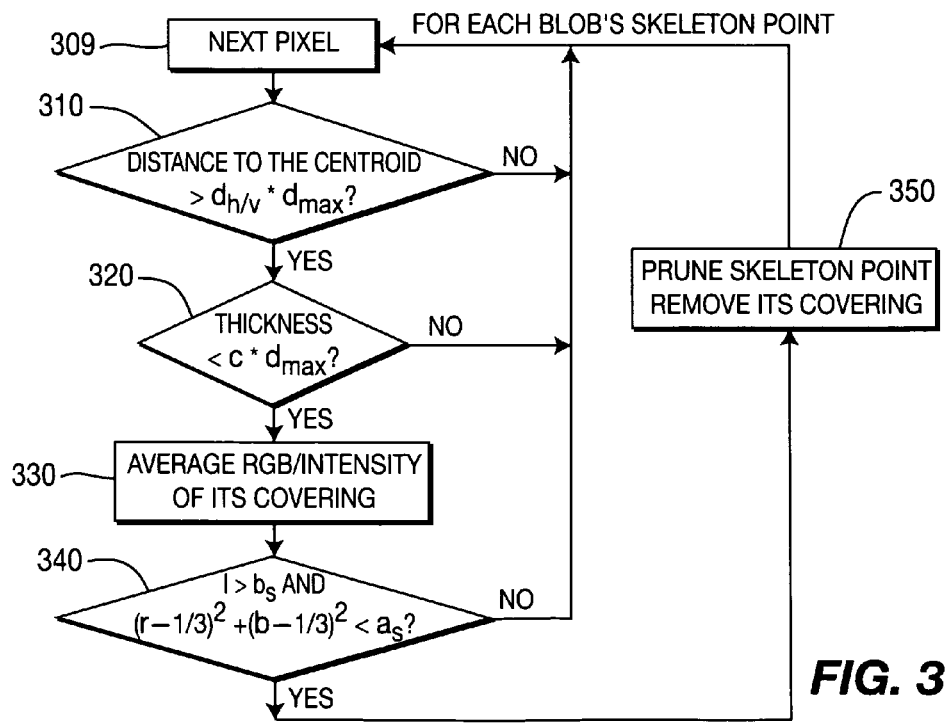
FIG. 3 illustrates an exemplary detailed method for artifact removal in accordance with the principles of the present invention.

At this point in the process, skeleton pruning is employed in step 270 and FIG. 3 to remove errors caused by artifacts.

Skeleton Pruning

When the player (referee) blob merges with fragments of field lines or curved lines (e.g., the curved lines at midfield or above the penalty area), shape analysis does not appear to generate the correct result in identifying the blob. The blob of interest may be removed incorrectly as a non-player blob by using global shape descriptors. Artifacts caused by field line fragments may trigger a bias that will hinder the location of the player.

In accordance with an aspect of the present invention, artifacts caused by field lines and curves are cut-off and removed by utilizing appearance priors and skeleton information and pruning. Step 270 in FIG. 2 shows the step of skeleton pruning. FIG. 3 shows, in more detail, an exemplary method including a set of steps for performing the skeleton pruning in step 270.

In general, the width of a field line or curve appears to less than the width of a player body in the long view shot. As a result, it is possible to check at every skeleton point of the blob of interest whether the thickness at that point is small compared with the maximum skeleton thickness. Specifically, the thickness of the blob's skeleton at the point is measured and tested against the product $c \cdot d_{max}$, where c is thickness factor. If it is the skeleton width is less than the product $c \cdot d_{max}$, then the average values of RGB components for all pixels covered by this skeleton point (Power labeling) are calculated. It has been observed in experimental practice that, when this skeleton point corresponds to a fragment of field lines, the average RGB component values of the skeleton point are close to those of the white color.

In order to avoid pruning an area incorrectly, distance constraints are added to the method in at least one implementation. From experimental practice, it is understood that the pruned skeleton is relatively far away from the human body centroid, which corresponds to the skeleton point with the maximal covering value. That is, the distance from the pruned skeleton point to the skeleton point with the maximal covering value is bigger than each of the horizontal distance $d_h \cdot d_{max}$ and the vertical distance $d_v \cdot d_{max}$, where $d_v$ and $d_h$ are distance factors and where $d_{max}$ is the maximum thickness of the skeleton as described above.

The process steps shown in FIG. 3 are performed for the individual skeleton points or pixels in each blob. The process is entered in step 309 for the next pixel. Control is then to transferred to step 310.

In step 310, for each skeleton point of the blob of interest, the distance from the skeleton point to the skeleton point with the maximal covering value is measured and tested to determine whether it exceeds each of the horizontal distance $d_h \cdot d_{max}$, and the vertical distance $d_v \cdot d_{max}$. The skeleton point having the maximal covering value normally coincides with the centroid of the blob. If there is more than one skeleton point having the maximal covering value, selects the one that is closest to the centroid of the blob. If the horizontal distance or the vertical distance is exceeded by the distance to the skeleton point with the maximal covering from the particular skeleton point, then the method proceeds to step 320. Otherwise, a new skeleton point is chosen for measurement and testing in the blob of interest and testing resumes at step 309.

In step 320, the thickness of the blob at the skeleton point under test is checked against the product $c \cdot d_{max}$. If the thickness is less than the product $c \cdot d_{max}$, then the method proceeds to step 330 where the average intensity values of RGB components for all pixels covered by this skeleton point (Power labeling) are calculated. If the thickness is greater than or equal to the product $c \cdot d_{max}$, then a new skeleton point is chosen for measurement and testing in the blob of interest and testing resumes at step 309.

In step 340, the intensity from step 330 is tested against threshold $b_S$. Also, the normalized red and blue component values of the skeleton point are tested against threshold according to the formula, $$(r-\tfrac{1}{3})^2+(b-\tfrac{1}{3})^2<a_S.$$

If both tests are true, then the method proceeds to step 350 wherein the skeleton point under test is pruned and its covering is removed. If either test or both tests in step 340 fail, then a new skeleton point is chosen for measurement and testing in the blob of interest and testing resumes at step 309. Step 340 uses the white pixel proportion in the covering of the skeleton point to determine whether or not to prune part of the skeleton.

In another embodiment, if one or more of the three tests at steps 310, 320, and 340 are positive, the skeleton point is pruned and its covering removed.

The implementations described herein may be implemented as, for example, a method or process, an apparatus, or a software program. Even though the presentation of the features of this invention has been in the context of a method, persons skilled in the art will discern that the invention may be embodied as, for example, an apparatus or a software program. An apparatus may be implemented in, for example, appropriate hardware, software, and firmware. The methods may be implemented in, for example, an apparatus such as, for example, a computer or other processing device. Additionally, the methods may be implemented by instructions being performed by a processing device or other apparatus, and such instructions may be stored on a computer readable medium such as, for example, a CD or other computer readable storage device, and an integrated circuit.

The exemplary values that can be used for the constants/thresholds mentioned herein are listed below:

| | Constant/threshold | | | | | | | | | |
|---|---|---|---|---|---|---|---|---|---|---|
| | $a_s$ | $ar_{max}$ | $ar_{min}$ | $b_s$ | $c$ | $d_h$ | $d_v$ | $e_{max}$ | $f_{max}$ | $p_w$ | $y_w$ |
| Exemplary value | 0.6 | 80 | 3 | 150 | 0.2 | 2 | 4 | 3 | 2 | 0.5 | 0.8 |

Further, other implementations are contemplated by this disclosure. For example, additional implementations may be created by combining, deleting, modifying, or supplementing various features of the disclosed implementations.

While this invention has been described as having a preferred embodiment, the present invention can be further modified within the spirit and scope of this disclosure. This application is therefore intended to cover any variations, uses, or adaptations of the invention using its general principles. For example, other types of objects may be located and tracked, and false alarms and artifacts may be identified for other types of objects or other types of game videos. This application is intended to cover such departures from the present disclosure as come within known or customary practice in the art to which this invention pertains and which fall within the limits of the appended claims.

The invention claimed is:

1. A method for identifying an object of interest in an image comprising background pixels and foreground pixels, said background pixels including pixels of a first color, the method comprising:
    extracting the foreground pixels from the image;
    identifying a region among the foreground pixels;
    if an area of the region is greater than a first area threshold and if a ratio of pixels of the first color in the region is less than or equal to a first color pixel ratio threshold, processing the region to produce a skeleton; and
    if elongation of the skeleton is smaller than an elongation threshold, determining the region as the object of interest.

2. The method of claim 1, wherein the object of interest includes a human object.

3. The method of claim 2, wherein the determining step includes determining that the region is the human object when the elongation of the skeleton is smaller than the elongation threshold and an aspect ratio of the skeleton is smaller than a aspect ratio threshold.

4. The method of claim 2, further comprising the step of pruning the skeleton to cut off artifacts.

5. The method defined in claim 4, wherein the step of pruning includes:
    if a thickness of the region at a point on the skeleton is less than a threshold based, at least in part, on a maximum thickness of the skeleton (320), pruning said point and removing associated pixels for said point.

6. The method defined in claim 4, wherein the step of pruning includes:
    if a distance from a point on the skeleton to another point in the skeleton associating with a maximal number of pixels is less than each of a vertical and horizontal threshold based, at least in part, on a maximum thickness of the skeleton (310), pruning said point and removing associated pixels for said point.

7. The method defined in claim 5, wherein the step of pruning further includes:
    if a distance from said point on the skeleton to another point in the skeleton associating with a maximal number of pixels is less than each of a vertical and horizontal threshold based, at least in part, on said maximum thickness of the skeleton (310), pruning said point and removing associated pixels for said point.

8. The method defined in claim 7, wherein the step of pruning further includes:
    if a pixel proportion of pixels of the first color in the associated pixels of said point exhibits sufficient intensity and normalized intensity of other color components exhibits insufficient intensity, pruning said point and removing said associated pixels for said point.

9. The method defined in claim 2, wherein the method further includes:

if an area of the region is greater than a first area threshold and less than a second area threshold and if a ratio of pixels of the first color in the region is greater than a second first pixel ratio threshold and if a roundness characteristic of said region is less than a roundness threshold and if an eccentricity characteristic of said region is less than an eccentricity threshold, determining the region as the object of interest including at least a ball.

10. The method defined in claim 2, wherein the extracting step further includes:
detecting a pixel as a background pixel classifier by using a likelihood ratio approach that is satisfied when:

$$\frac{P(rgb \mid playfield)}{P(rgb \mid \text{non\_playfield})} \geq \phi,$$

where $0 \leq \phi \leq 1$ and where $$P(rgb \mid playfield) = \frac{f(rgb)}{T_f},$$

and $$P(rgb \mid \text{non\_playfield}) = \frac{n(rgb)}{T_n},$$

where f(rgb) gives the count in bin rgb of a background histogram, n(rgb) is the count in bin rgb from a foreground histogram, each histogram including N bins, and $T_f$ and $T_n$ are total counts in the background and foreground histograms, respectively.

11. A machine readable medium having stored thereon machine executable instructions that, when executed, implement a method for identifying an object of interest in an image comprising background pixels and foreground pixels, said background pixels including pixels of a first color, the method comprising:
extracting the foreground pixels from the image;
identifying a region among the foreground pixels;
if an area of the region is greater than a first area threshold and if a ratio of pixels of the first color in the region is less than or equal to a first color pixel ratio threshold (240), processing the region to produce a skeleton; and
if elongation of the skeleton is smaller than an elongation threshold, determining the region as the object of interest including at least a human object.

12. The machine readable medium of claim 11, wherein the object of interest includes a human object.

13. The machine readable medium of claim 12, wherein the determining step performed via execution of the instructions includes determining that the region is the human object when the elongation of the skeleton is smaller than the elongation threshold and an aspect ratio of the skeleton is smaller than an aspect ratio threshold.

14. The machine readable medium of claim 12, wherein the method performed via execution of the instructions further comprises the step of pruning the skeleton to cut off artifacts.

15. The machine readable medium defined in claim 14, wherein the step of pruning performed via execution of the instructions includes:

if a thickness at a point on the skeleton is less than a threshold based, at least in part, on a maximum thickness of the skeleton, pruning said point and removing associated pixels for said point.

16. The machine readable medium defined in claim 14, wherein the step of pruning performed via execution of the instructions includes:
if a distance from a point on the skeleton is less than each of a vertical and horizontal threshold based, at least in part, on a maximum thickness of the skeleton, pruning said point and removing associated pixels for said point.

17. The machine readable medium defined in claim 15, wherein the step of pruning performed via execution of the instructions further includes:
if a distance from said point on the skeleton is less than each of a vertical and horizontal threshold based, at least in part, on said maximum thickness of the skeleton, pruning at said point and removing said associated pixels for said point.

18. The machine readable medium defined in claim 17, wherein the step of pruning performed via execution of the instructions further includes:
if a pixel proportion of pixels of the first color in the associated pixels of said point exhibits sufficient intensity and normalized intensity of other color components exhibits insufficient intensity, pruning said point and removing said associated pixels for said point.

19. The machine readable medium defined in claim 12, wherein the method performed via execution of the instructions further includes:
if an area of the region is greater than a first area threshold and less than a second area threshold and if a ratio of pixels of the first color in the region is greater than a second first color pixel ratio threshold and if a roundness characteristic of said region is less than a roundness threshold and if an eccentricity characteristic of said region is less than an eccentricity threshold, determining the region as the object of interest including at least a ball.

20. The machine readable medium defined in claim 12, wherein the extracting step performed via execution of the instructions further includes:
detecting a pixel as a background pixel classifier by using a likelihood ratio approach that is satisfied when:

$$\frac{P(rgb \mid playfield)}{P(rgb \mid \text{non\_playfield})} \geq \phi,$$

where $0 \leq \phi \leq 1$ and where $$P(rgb \mid playfield) = \frac{f(rgb)}{T_f},$$

and $$P(rgb \mid \text{non\_playfield}) = \frac{n(rgb)}{T_n},$$

where f(rgb) gives the count in bin rgb of a background histogram, n(rgb) is the count in bin rgb from a foreground histogram, each histogram including N bins, and $T_f$ and $T_n$ are total counts in the background and foreground histograms, respectively.

* * * * *